US005766667A

United States Patent [19]
Hochman

[11] Patent Number: 5,766,667
[45] Date of Patent: Jun. 16, 1998

[54] PROCESS FOR PRODUCING A FOOD PRODUCT FROM WHOLE VEGETABLES AND ANIMAL MEAT

[76] Inventor: Mitchell Hochman, 31 Jane St., Suite 9G., New York, N.Y. 10014

[21] Appl. No.: 775,775

[22] Filed: Dec. 31, 1996

Related U.S. Application Data

[60] Provisional application No. 60/013,140 Mar. 11, 1996.

[51] Int. Cl.$^6$ .................................................. A23L 1/317
[52] U.S. Cl. ...................... 426/641; 426/92; 426/102; 426/105; 426/615; 426/652; 426/801; 426/810
[58] Field of Search .......................... 426/92, 102, 105, 426/615, 641, 652, 801, 810

[56] References Cited

U.S. PATENT DOCUMENTS

| 116,389 | 6/1871 | Zumstein | 426/641 |
|---|---|---|---|
| 3,943,263 | 3/1976 | Sato et al. | 426/105 |
| 4,892,749 | 1/1990 | Johnson et al. | 426/105 |

FOREIGN PATENT DOCUMENTS

| 14781 | of 1886 | United Kingdom | 426/105 |
|---|---|---|---|
| 23678 | of 1894 | United Kingdom | 426/105 |

*Primary Examiner*—Helen Pratt
*Attorney, Agent, or Firm*—Steinberg, Raskin & Davidson, P.C.

[57] ABSTRACT

A process for producing a meat analogue comprising the steps of liquefying whole vegetables being about 70% to about 99% water, thereby eliminating the need for added water, and blending the liquefied whole vegetables with animal meat to form a blended beef block.

20 Claims, No Drawings

PROCESS FOR PRODUCING A FOOD PRODUCT FROM WHOLE VEGETABLES AND ANIMAL MEAT

This application hereby claims the benefit of U.S. provisional patent application Ser. No. 60/013,140 filed Mar. 11, 1996.

BACKGROUND OF THE INVENTION

The present invention relates to a method for producing a food product using a combination of meat and fresh whole vegetables, as well as the food product produced by the method, which is designed to simulate a frankfurter or a bologna but is not limited thereto.

In response to public perception regarding the health risks in connection with the consumption of red meat and products formed thereby, it has become a common goal amongst those in the art to produce a food product comprising meat which has a lower fat content and which is more healthy. To achieve this goal, meat manufacturers have substituted turkey and/or chicken for beef in such food products because of their perceived low fat content. However, the recent introduction of the new food labeling laws have defined fat content as a percentage of calories thus enlightening consumers to the fact that these meat substitutes are not substantially lower in fat than beef. In addition, the utilization of meat substitutes have left consumers' cravings for red meat unsatisfied. Thus, the failure to reduce the true fat content of these products in combination with the lack of the "meaty" taste consumers desire of such products have caused some difficulties in the art of healthy meat food product processing.

Other attempts have been made to produce a food product comprising meat by combining a vegetable protein material such as a vegetable protein concentrate or a vegetable protein isolate with meat and water. One such process is described in U.S. Pat. No. 5,183,683 (Mott et al.). In this process, the protein is isolated from the vegetable to produce a product containing a relatively high protein content normally in the form of a powder having a fairly neutral flavor and color. This vegetable protein isolate is then blended with frozen animal food product. The product of this process in which protein is extracted from the vegetables, however, fails to provide the health benefits which are inherent in whole vegetables. Whole vegetables are known to decrease the chances for developing certain types of cancer as well as being a good source of fiber necessary to one's diet. Conversely, health reports have confirmed that synthesized vegetables or extracts do not have the same nutrition value as natural whole vegetables. Thus, while meat products enhanced with vegetable protein material such as vegetable protein isolate purport to be a healthy substitute to a product formed solely from meat, such products, which utilize the proteins from vegetables in an extracted state, fail to yield the health benefits which may potentially be derived from meat products fortified with whole vegetables.

It has also been suggested to produce a food product comprising meat and whole vegetables whereby the whole vegetables are chopped into small pieces while adding water. The vegetables and added water are then blended with the meat and cooked to form the food product. The product of this process, however, fails to provide the health benefits which may potentially be derived from a process whereby whole vegetables are first liquefied, providing the product of the process with the needed moisture, thereby eliminating the need for added water. In a process comprising such a liquefication step, a food product is produced comprising a greater amount of whole vegetables and, subsequently, a greater amount of nutrients.

OBJECTS AND SUMMARY OF THE INVENTION

It is an object of the present invention is to provide a process for producing a food product comprising meat.

It is another object of the invention to provide a process for producing a food product comprising meat designed to simulate a frankfurter or bologna.

It is still another object of the present invention to provide a process for producing a food product comprising meat and whole vegetables which provides the positive health effects of the whole vegetables.

It is another object of the present invention is to provide a process for producing a food product comprising meat which substitutes whole vegetables for water as the food product's moisture source.

In accordance with the present invention, these and other objects are attained by providing a process for producing a meat analogue comprising the steps of liquefying a whole vegetable, thereby eliminating the need for added water, and thereafter blending the liquefied whole vegetable with animal meat to form a blended beef block.

Although any ratio of vegetable to meat previously deemed useful to manufacture meat analogue products can be used, it is preferred to use a ratio of whole vegetables to animal meat of about one to about 5 and more preferably from about one to about 4.

In another embodiment of the invention, a quantity of water is optionally added to promote the liquefication process whereby the amount of added water does not exceed the amount of liquefied whole vegetable.

In another embodiment of the invention, a natural colorant, preferably canthaxinthin, is dissolved in water and blended with the liquefied whole vegetable and the animal meat under conditions of shear with spices, sodium nitrites, flavorings, sweeteners, sodium phosphate, sodium erythorbate, paprika, and/or soy protein concentrate to form the blended beef block in order to provide the final product with the desired taste and color. In this embodiment, the ratio of the ingredients can range from one part whole vegetable to about 0.9 to about 8.0 parts animal meat to about 0.01 to about less than 1 parts added water.

The blended beef block is then emulsified to form a creamy thick mixture which is then vacuum stuffed in a casing having a pre-cooked internal temperature of less than about 68° F. The encased mixture is then cooked at a temperature from about 160° F. to about 176° F. to form a simulated frankfurter or bologna.

It is an important and remarkable advantage of the present invention over the prior art that, according to the process of the present invention, a frankfurter is formed that is tastier and more nutritious than prior art frankfurters. This is accomplished by substituting whole vegetables for the added water as the product's moisture source (the Department of Agriculture's guidelines allow frankfurters and other products to be up to but not including 40% moisture). The utilization of whole vegetables in lieu of water as the product's source of moisture provides the final product with the positive health benefits which occur naturally in whole vegetables and which are not found in prior art frankfurters which merely use meat substitutes or vegetable protein extracts.

DETAILED DESCRIPTION OF THE INVENTION

A process according to the invention for the production of a food product comprising animal meat and whole vegetables begins with the cleaning of the whole vegetables. The term "whole vegetable" is defined as the edible parts of a vegetable in its untreated state and not solely the extracted vitamins of such vegetable, fresh or frozen. The whole vegetables are initially cleaned with cold water after stems and unusable parts are cut off and are then spun dry to reduce excess water.

The vegetables to be used in the process of the invention have unique characteristics which are necessary for the process. That is, the choice of vegetables is critical to the taste, texture, color and nutrition value of the final product produced by the process. Thus, the invention makes deliberate use of vegetables having certain characteristics. Such characteristics are, e.g., the water content and nutritional value of the vegetables.

Since the vegetables used in the process of the invention are the final product's moisture source and while too much moisture causes the product to lose its texture and too little moisture hardens and dries the product out, any whole vegetable with a sufficient water content can be used. It is preferred that each vegetable used have a water content from about 85% to about 95% but each vegetable used can have a water content from about 70% to about 99%. Such vegetables include, for example, carrots (88–92% water), cauliflower (90% water), broccoli (over 90% water) and spinach (90–93% water). However, it is noted that while these specific vegetables are used in the preferred embodiment of the invention, other vegetables having these desired characteristics can also be used.

It is preferable that the liquefied whole vegetables comprise a ratio of one part carrots to about 0.01 to about 0.74 parts other vegetables, said other vegetables being, e. g. cauliflower, spinach and broccoli. More specifically, the liquefied whole vegetables comprise a ratio of one part carrots to about 0.49 parts broccoli to about 0.49 parts spinach to about 0.49 parts cauliflower.

In addition to the vegetables' moisture content, vegetables are chosen because of their individual nutrition values. For example, in a preferred embodiment of the invention, carrots, cauliflower, broccoli and spinach are used because of their positive health benefits. Carrots are the richest source of vitamin A (a 3½ oz. serving provides more than double the recommended dietary allowance (RDA) for adults) and are low in calories (29–42 Kcal per 100 g). However, carrots must be cooked above 175° F. to prevent the undesirable enzyme action which may occur and which lowers the final product's shelf life. Cauliflower is also low in calories and is a good source of vitamin C. Broccoli contains protein, calcium, phosphorus, iron, potassium, vitamin A, vitamin C and bioflavonoid while spinach is an excellent source of magnesium, iron, potassium, vitamin A, phosphorus, zinc, pantothenic acid, pyridoxine (vitamin B-6) and calcium.

After the vegetables are cleaned they are liquefied. This is accomplished by placing the green vegetables, e.g. spinach and broccoli, in a liquefier with only that amount of water which is needed to promote the liquefication process. The blades are then rotated at a high speed. The contents are then placed in a bowl cutter while carrots and cauliflower are added under conditions of shear until all plant fibers are minced thoroughly forming the vegetable mixture. In order to maximize the aesthetic value of the final product while making it appetizing to the consumer, the liquefying process is continued until the green speckles which are inherent when mixing green vegetables have substantially disappeared. It is noted however, that such green speckles may be allowed to remain in the final product if consumer taste so dictates. In another embodiment of the invention, prior to mincing the carrots and cauliflower with the spinach and broccoli, a portion of the carrot fibers are discarded in order to reduce the bitter taste which may occur in such carrot fibers.

After the liquefied vegetable mixture is formed, a natural colorant is prepared. The addition of a natural colorant in the process of the invention is desirable because the chlorophyll which is inherent in the broccoli and spinach has the effect of providing the meat with a beige color. While in the preferred embodiment of the invention canthaxinthin is used as the natural colorant, any other colorant known in the industry can be used. The natural colorant is prepared by dissolving it in water in a sterilized self-contained mixer at a temperature from about 140° F. to about 158° F. for a period of time to fully dissolve the colorant, generally from about 2 to about 3 minutes, and then incrementally cooling the dissolved colorant to room temperature.

The addition of water during the process of the present invention can occur during one of several steps of the process, if at all. For example, an amount of water can be added at any time during the liquefication process to promote such process, or an amount of water can be added to promote the dissolving of the natural colorant. However, the amount of water added, if any, will always be less than the amount of liquefied whole vegetable used in the process of the invention.

The next step in the process of the present invention is to blend the liquefied vegetable mixture and the natural colorant mixture with the animal meat. The term "meat" as used herein includes not only that which would be recognized as "meat" by the layman, i.e., beef, turkey, chicken, pork, lamb, sheep, etc., but also that which is considered "meat" by the food processing industry. Thus, the process of the invention can utilize such meat as fish, venison, crabs, lobsters and meat by-products. Further, the process of the invention can utilize any mixture of the above-mentioned meat products. As such, any meat which is accepted at the particular time the process is performed in the particular place the process is performed is compatible with the present invention. In the preferred embodiment of the invention however, beef is used as the chosen meat source. More specifically, lean parts are taken from a full-grown ox, cow, bull or steer (i.e. beef) and the beef chosen will vary in fat content from about 5% to about 15% causing the final product to be a "low-fat" food.

The liquefied whole vegetable, natural colorant mixture and beef are blended under conditions of shear with spices, sodium nitrites, flavorings, sweeteners, sodium phosphate, sodium erythorbate, paprika, and soy protein concentrate to form a blended beef block. The temperature of the beef used is preferably about 33° F. before the liquefying step begins and the soy protein concentrate is in the form of a 70% white concentrate powder (the final product of the preferred embodiment of the process of the invention comprises less than about 2% of the soy protein concentrate). The blended beef block is then emulsified to form a creamy thick mixture. Any emulsifier known to those skilled in the art may be used. The contents are then vacuum stuffed into casing or links wherein the internal temperature of the encased material after vacuum stuffing should not exceed about 68° F.

Since it is desirable that the internal temperature of the encased contents stay below about 68° F. thereby avoiding "beef burn out" (which destroys the texture, i.e., protein chains in beef), the temperature of each element of the entire mixture as well as the heat produced by each step of the process can be varied accordingly. For example, the shearing process increases the temperature of the mixture by friction in direct proportion to the speed of the blades and the length of exposure time, and the initial temperature of each ingredient varies from frozen (less than 32° F.) to fresh (room temperature). Thus, the speed and duration of the liquefying, shearing, emulsifying, and vacuum stuffing, the ingredient temperatures and the temperature of the room where processing takes place are regulated to produce the in-cased internal precooked temperature of less than about 68° F. Since fresh beef is preferred over frozen beef and fresh vegetables are preferred over frozen vegetables, it may be necessary to add ice to the mixture in order to keep temperatures down. If either frozen beef or frozen vegetables are used, the need for ice is reduced. The determining factor for the use of either frozen beef or vegetables is based on availability and price.

After the contents are vacuum-stuffed, the encased material is cooked in a smoke house until an internal temperature of about 160° F. to about 176° F. is reached. The exact internal temperature is dictated by the desired texture after cooking. The encased material is then chilled overnight at a temperature below about 36° F. If an artificial casing is used, such casing would then be peeled off.

An important aspect of the present invention is the content ratio of the vegetables to beef to added water comprising the final product. Each ingredient must be regulated such that there is not too much or too little moisture in the final product. As previously stated, too much moisture may cause the product to lose its texture while too little moisture may cause the product to harden or dry out during cooking. The preferred embodiment of the present invention comprises a ratio of one part whole vegetables to about 4 to about 5 parts beef to about 0.3 to about 0.6 parts added water. This is in contrast to prior art frankfurters or the like wherein the amount of added water comprises almost 40% of the final product thereby almost equaling the amount of meat. However, the contents of the ingredients can be varied such that the final product comprises a ratio of one part vegetable to anywhere from about 0.9 to about 8 parts beef to about 0.01 to about less than 1 part added water. It should be noted that since the whole vegetables act as the product's moisture source, as the vegetable content is raised, the water content is able to be lowered. Further, if it is so desired that the vegetable content completely replaces the water (with the exception of that water needed to dissolve the natural colorant), the taste of the final product may be regulated such that it is overly dominated by vegetable.

The invention is further illustrated by the following Example.

EXAMPLE

Spinach, broccoli, cauliflower and carrots are cleaned with cold water after stems and unusable parts are cut off and discarded. The vegetables are then spun dry to reduce the excess water. Spinach and broccoli are then put in a liquefier with measured amounts of water. The contents are then put in a bowl cutter and carrots and cauliflower are added while the blades of the mixing bowl are moving at a low speed. The vegetables are liquefied until the green speckles which are inherent in a vegetable mixture are substantially no longer visible.

Canthaxinthin (a natural colorant), at room temperature, is dissolved in water at a temperature between about 140° F. and about 158° F. in a sterilized closed container and the dissolved colorant is then incrementally cooled to room temperature.

Fresh lean beef is then taken out of a refrigerator at a temperature of about 33° F. and put in the mixing bowl with the vegetable mixture, the dissolved canthaxinthin and about 90 lbs. of ice, spices, sodium nitrites, flavorings, sweeteners, sodium phosphate, sodium erythorbate, paprika, and/or soy protein concentrate. The contents of the mixing bowl are blended while the chopper is running at a high speed with the texture of the mixture remaining thick and the temperature of the mixture rising to between about 40° F. to about 55° F.

The chopper is then reduced to a lower speed and the contents of the mixing bowl are emptied into an emulsifier where it is transformed into a creamy thick mixture.

The creamy thick mixture is then vacuum stuffed into links with a finished internal temperature of about 66° F. The encased material is cooked in a smoke house until the internal temperature of the encased material is about 160° F. to about 176° F. The product is then chilled overnight at a temperature below about 36° F. and peeled.

Obviously, numerous modifications and variations of the present invention are possible in light of the teachings hereof. Therefore, it is to be understood that the invention can be varied from the detailed description above within the scope of the claims appended hereto.

What is claimed is:

1. A process for producing a meat analogue, comprising the steps of:
   liquefying whole vegetables in their untreated state, said whole vegetables being about 70% to about 99% water such that said liquefied whole vegetables contain said about 70% to about 99% water, and
   blending said liquefied whole vegetables containing said about 70% to about 99% water with animal meat to form a blended beef block.

2. A process according to claim 1, further comprising the step of optionally adding a quantity of water to said liquefied whole vegetable to promote said liquefication process in an amount not to exceed the amount of liquefied whole vegetables.

3. A process according to claim 2, wherein said blended beef block comprises a ratio of one part whole vegetables to about 0.9 to about 8.0 parts animal meat to about zero to less than one parts added water.

4. A process according to claim 3, wherein said blended beef block comprises a ratio of one part whole vegetables to about 0.9 to about 8.0 parts animal meat to about 0.01 to about less than one parts added water.

5. A process according to claim 3, wherein said blended beef block comprises a ratio of one part whole vegetables to about 0.9 to about 8.0 parts animal meat to about 0.3 to about 0.6 parts added water.

6. A process according to claim 1, further comprising the step of dissolving a natural colorant in water to form a natural colorant mixture and wherein said blending step further comprises blending said liquefied whole vegetables and said animal meat with said natural colorant mixture.

7. A process according to claim 6, further comprising the step of blending said liquefied whole vegetables, said animal meat and said natural colorant mixture under conditions of shear with spices, sodium nitrites, flavorings, sweeteners, sodium phosphate, sodium erythorbate, paprika, and/or soy protein concentrate.

8. A process according to claim 1, wherein said whole vegetables is chosen from a group consisting of carrots, spinach, broccoli and cauliflower.

9. A process according to claim 1, wherein said blended beef block comprises a ratio of one part whole vegetables to about 0.9 to about 8.0 parts animal meat.

10. A process according to claim 9, wherein said blended beef block comprises a ratio of one part whole vegetables to about 3.0 to about 7.0 parts animal meat.

11. A process according to claim 9 wherein said blended beef block comprises a ratio of one part whole vegetables to about 4.0 to about 5.0 parts animal meat.

12. A process according to claim 1, wherein said liquefying step comprises the steps of liquefying a green whole vegetable wherein said green whole vegetable is chosen from the group consisting of broccoli and spinach, adding a non-green whole vegetable to said liquefied green whole vegetable wherein said non-green whole vegetable is chosen from the group consisting of carrots and cauliflower, and liquefying said green whole vegetable and said non-green whole vegetable.

13. A process according to claim 12, wherein prior to the step of adding a non-green whole vegetable to said liquefied green whole vegetable, the process further comprises the step of discarding a portion of said non-green whole vegetable such that the bitter taste which may occur in such non-green whole vegetable is reduced.

14. A process according to claim 1, wherein green speckles appear during said liquefying step and wherein said liquefying step is performed until said green speckles substantially disappear.

15. A process according to claim 1, wherein said liquefied whole vegetables comprises a ratio of one part carrots to about 0.01 to about 0.74 parts other vegetables, said other vegetables being chosen from a group consisting of cauliflower, spinach and broccoli.

16. A process according to claim 1, wherein said liquefied whole vegetables comprises a ratio of one part carrots to about 0.49 parts broccoli to about 0.49 parts spinach to about 0.49 parts cauliflower.

17. A process according to claim 1, further comprising the step of emulsifying said blended beef block to form a creamy thick mixture.

18. A process according to claim 17, further comprising the step of vacuum stuffing said creamy thick mixture in a casing.

19. A process according to claim 18, further comprising the step of cooking said encased mixture until said encased mixture reaches an internal temperature of about 160° F. to about 176° F. to form a simulated frankfurter or bologna.

20. In a process for producing a meat analogue, comprising the steps of:

blending whole untreated vegetables with animal meat and providing moisture to form a blended beef block, the improvement comprising prior to blending said whole untreated vegetables with said animal meat, liquefying said whole vegetables to produce said provided moisture.

* * * * *